United States Patent
Hunt

[11] 3,790,804
[45] Feb. 5, 1974

[54] RADIOACTIVITY MONITORING APPARATUS FOR FLUIDS IN FLOW

[75] Inventor: David O. Hunt, Bedford, Mass.

[73] Assignee: Lee Corporation, Waltham, Mass.

[22] Filed: May 1, 1972

[21] Appl. No.: 249,689

[52] U.S. Cl................................. 250/506, 250/356
[51] Int. Cl............................................ G01n 23/12
[58] Field of Search.... 250/43.5 D, 43.5 MR, 108 R

[56] References Cited
UNITED STATES PATENTS

| | | | |
|---|---|---|---|
| 2,082,299 | 6/1937 | Nonhebel et al. | 73/53 |
| 3,250,118 | 5/1966 | Johnson, Jr. | 73/53 |
| 3,560,741 | 2/1971 | Strindehag | 250/71.5 |
| 3,466,227 | 9/1969 | Finch | 250/108 R X |
| 3,597,613 | 8/1971 | Rajagopal | 250/43.5 D |

*Primary Examiner*—Archie R. Borchelt
*Attorney, Agent, or Firm*—Richard J. Donahue

[57] ABSTRACT

Unusually high sensitivity is obtained in a radioactivity monitor for fluid in flow by blocking external background "noise" with four pi shielding, minimizing residual contamination as a source of internal noise with a dynamic swirl in a removable bowl-shaped container having a smoothly curving surface passing into a bottom outlet, and providing a constant sampling volume by maintaining an external fluid level above that of the container and by venting through the top of the container.

14 Claims, 1 Drawing Figure

PATENTED FEB 5 1974　　　　　　　　　　　3,790,804
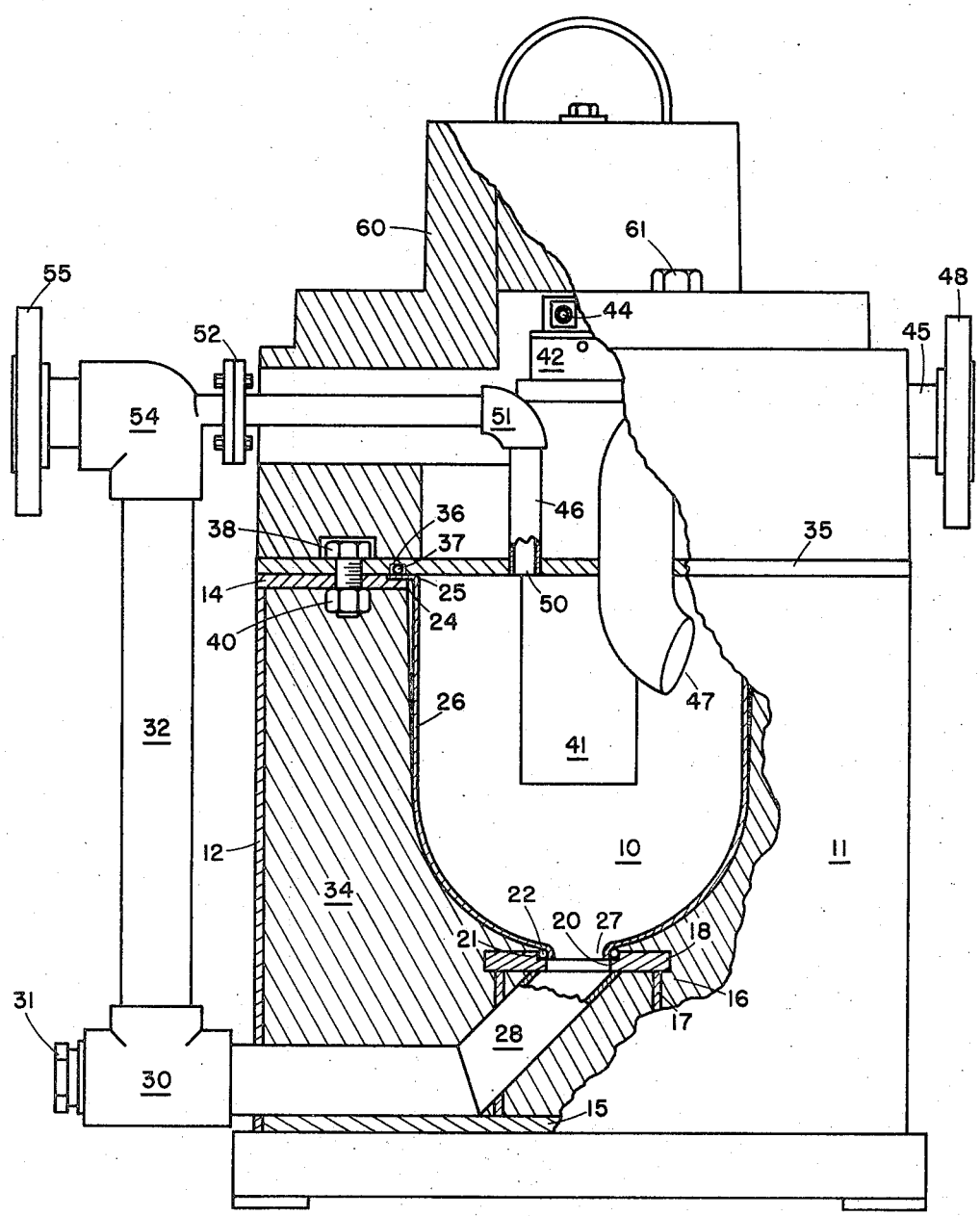

RADIOACTIVITY MONITORING APPARATUS FOR FLUIDS IN FLOW

BACKGROUND OF THE INVENTION

1. Field of the Invention

The invention relates to radioactivity monitors and in particular to such monitors connected in a fluid flow system such as the cooling system of a nuclear reactor.

2. History of the Invention

In all radiation detection systems, the important sensitivity of the system is the sensitivity above background noise. In a system for monitoring radioactivity of fluid in flow, the background noise includes:

a. ambient radioactivity reaching the detector from outside the monitored volume;
b. residual contamination in the container of the monitored volume from the passage of past volumes;
c. self-generated noise in the detector and amplifiers.

For meaningful comparative results, it is necessary to either detect background noise separately and subtract it from the reading or positively limit background noise to a level of relative insignificance. Still a further source of error effectively lowering the meaningful sensitivity of the system is variations in the actual volume of fluid monitored. A common cause of such variations when the fluid is a liquid is entrained gas that is released and becomes trapped within the container.

Monitoring has been done with lead-shielded pipe sections having the radiation detector supported in an aperture in the shielding. Examples of this are found in Patigny, U.S. Pat. No. 3,502,869 and also in the model MW-2P water sampler available from LFE Corporation, assignee of the present invention. These devices have limited shielding of the detector assembly and do not shield against radiation entering axially through the pipe section. More complete shielding is found in the model RD-33 Detector Assembly available from Gulf Electronic Systems of San Diego, Calif. This more complete shielding is conventionally termed four pi shielding, the term being derived from the formula for the area of a sphere. The RD-33 has no provision for release of trapped gas. It also would tend to collect contaminants at the junction of the flat bottom and cylindrical wall. While the RD-33 includes shielding around the exterior of the detector component, it has no shielding against radiation entering axially through the connecting pipes which connect directly to the sidewalls of the container. The RD-33 uses a removable stainless steel container to facilitate cleaning as in the present invention, but requires relatively difficult sealing for the sidewall entrance lines.

SUMMARY OF THE INVENTION

In accordance with the present invention it has been found that a four pi shielded removable sampling container can be made with the inlet and outlet pipes arranged to limit axial entry of exterior radiation and that it can be made in a configuration to enhance self-cleansing action. A bowl-shaped removable container has a cover containing a well or other mounting for supporting a radiation detector within the container. Lead shielding surrounds the container and detector. A liquid inlet pipe passes through the shielding above the container passing downwardly through the cover to the container. The inlet nozzle is directed to produce a swirling action within the container. An outlet pipe connects to the container at a bottom orifice of the container. The outlet pipe turns away from the bottom orifice through the lead shielding to connect to an exterior riser pipe. The riser pipe extends above the container cover and provides a connection for an outlet main at a level above said container. A vent pipe from the container cover also connects to the riser pipe above the container for releasing trapped gas into the outlet main.

Thus it is an object of the invention to provide radioactivity monitoring apparatus for fluids with improved shielding:

It is a further object of the invention to provide a self-cleaning container for a sample volume of fluid in radioactivity monitoring apparatus;

It is a further object of the invention to provide a readily removable sample volume container for fluids in radioactivity monitoring apparatus;

It is still a further object of the invention to provide radiation monitoring apparatus for liquids in flow in which the sample volume is maintained constant by maintaining the exterior liquid level above the sample level and connecting a gas vent path from the top of the sampling container to an outlet connection above said container.

Further objects and features of the invention will become apparent upon reading the following description together with the drawing.

BRIEF DESCRIPTION OF THE DRAWING

The FIGURE is a front elevation partially in section at the central vertical plane of radioactivity monitoring apparatus according to the invention.

DESCRIPION OF THE PREFERRED EMBODIMENT

Radioactivity monitoring apparatus according to the invention uses a four pi shielded bowl-shaped container. Referring to the drawing, bowl-shaped container 10 is mounted in housing 11 made of sheet metal or pipe section. Housing 11 includes cylindrical wall 12, top plate 14, bottom plate 15 and internal support frame 16. Wall 12, plate 14 and plate 15 are suitably brazed or welded together to form an enclosed cylindrical chamber.

Frame 16 includes stand 17 secured to bottom plate 15 at its center and carrying circular plate 18. Stand 17 as depicted is two cylindrically shaped supports but other structure suitable for supporting plate 18 while leaving open access to the space beneath plate 18 may be used. Plate 18 has a central circular aperture 20. At the upper edge of aperture 20 is an annular recess 21 retaining o-ring gasket 22.

Top plate 14 has central circular opening 24 slightly larger than the upper diameter of bowl 10. The upper edge of opening 24 is recessed to receive lip 25 of bowl 10.

Container 10 has smooth (for example a number 16 finish) sidewall 26 curving continuously into outlet orifice 27 passing through o-ring 22. Container 10 fits into housing 11 with lip 25 retained in plate 14 and orifice 27 fitting snugly into o-ring 22.

Outlet pipe 28 is connected to plate 18 facing the bottom of aperture 20 by brazing or other suitable connection means. Pipe 28 slopes away from the axis of aperture 27 at an angle preferably of about 45° in order to direct heavy contaminants down a steep path that quickly carries them out of vertical alignment with orifice 27. Pipe 28 preferably continues at approximately this slope until its upper wall is at least two inches from the nearest part of container 10 so that an effective amount of shielding lead can be interposed. In the actual assembly upon which the drawing is based, this distance is about 3 inches and pipe 28 turns to the horizontal at that distance. Pipe 28 passes through an aperture in wall 12 and connects with tee connector 30. The other two branches of tee connector 30 connect cleanout plug 31 horizontally in line with pipe 28 and vertical riser pipe 32 extending vertically on the outside of wall 12.

All remaining space between container 10 and housing 11 is filled with lead or other suitable shielding material 34. To obtain good shielding the thickness of the shielding material in the depicted apparatus is greater than three inches all around container 10.

Circular cover plate 35 fits over top plate 14 covering container 10. Cover plate 35 has an annular recess 36 facing lip 25 of container 10 for retaining o-ring gasket 37.

A plurality of bolts 38 arranged around container 10 secure cover plate 35 to top plate 14. Bolts 38 thread into nuts 40 embedded in shielding material 34.

Mounted to cover plate 35 is well 41 for supporting a detection device. Various radiation monitoring detectors may be supported in well 41 or otherwise mounted on cover plate 35. A sodium iodide crystal detector assembly 42 for gamma radiation is shown extending above well 41. Electrical connections to a photomultiplier tube in detector assembly 42 are made at jack 44. Well 41 is mounted centrally in cover plate 35.

Inlet pipe 45 and gas vent pipe 46 are sealingly mounted to cover plate 35 in front of the cross-section plane of the drawing. Pipes 45 and 46 are displaced from center enough to provide reasonable clearance from well 41 and detector assembly 42. Pipes 45 and 46 rise vertically and then turn and pass outwardly in opposite directions on the same horizontal axis. It should be noted in this respect that, riser pipe 32 rises to join this horizontal axis, but tee connector 30 is turned so that while connector 30 is in front of the cross-section plane of the drawing, pipe 28 angles back to join aperture 20 at the cross-section plane.

While pipes 46 and 45 could be lined up horizontally across the center of container 10 connecting to cover plate 35 on opposite sides of well 41, the off set configuration described avoids line-of-sight travel of radiation down the pipe axes to well 41 and detector 42.

Pipe 45 extends vertically through and is supported by cover plate 35. Immediately below plate 35, pipe 45 curves so that discharge nozzle 47 is directed along the side of container 10 near the top so as to induce a swirling action. Above plate 35, pipe 45 extends through a curve into a horizontal plane and is joined to a standard pipe coupling flange outside the circumference of housing 11.

Pipe 46 has orifice 50 flush with the bottom of plate 35. Pipe 46 extends vertically upward and through elbow 51, turns in a horizontal plane along the same horizontal axis as pipe 45. Pipe 46 is connected to flange coupling 52 which connects to ninty degree elbow 54 beyond the circumference of housing 11.

Elbow 54 connects to standard pipe flange 55 of the same size as flange 48 such that flanges 48 and 55 face outwardly on opposite sides of housing 11 with their central axes horizontally aligned. Elbow 54 also connects vertically downward to riser pipe 32.

The connection of vent pipe 46 into elbow 54 is through an additional small aperture in the outside wall of elbow 54.

Lead shielding 60 with passages for pipes 45 and 46 and a central void for detector 42 is positioned on top of plate 35. This lead shielding is depicted as made of castings which are positioned around the piping and the detector and bolted into place by bolts 61 which extend down through the shielding and plates 35 and 14 to screw into further nuts similar to nuts 40 embedded in shielding material 34 around container 10.

As an alternative to using the precast shielding depicted, it is contemplated to pour molten shielding metal around pipes 45 and 46. The structure consisting of plate 35, detector well 41 and the connected pipes would be positioned in a mold which would also block the molten metal from detector well 41 and sufficient cylindrical space above it for insertion and removal of detector components. A lead plug would then be inserted over the detector in operation.

Thus shielding metal completely surrounds container 10 with entrance passages (for wiring connection, pipes 45, 46 and 28) either well above or well below container 10 and lying in a horizontal plane such that exterior radioactive radiation is substantially blocked from container 10.

All metal parts other than shielding components are suitably of stainless steel or other hard corrosion resistant material. Housing wall 12 and parts not exposed to the fluid being monitored may be mild steel or the like. Sheet metal parts and piping components secured together by unobvious means are suitably brazed, or welded.

OPERATION OF THE INVENTION

The monitoring apparatus depicted is utilized by mounting it in a fluid flow line with an inlet connection at flange 48 and an outlet connection at flange 55. Detector 52 is connected via jack 44 to a radiation meter or counter. Commonly a preamplifier is connected between the detector and the meter or counter and this preamplifier may be internally mounted as a part of detector 44 or it may be external. Accumulating counters or recorders are also frequently connected to the monitoring apparatus.

When the fluid flow is turned on, container 10 fills completely to plate 35. The use of inlet and outlet connections above container 10 assures filling of container 10. Any trapped gas passes off through vent orifice 50 into the outlet. As container 10 fills, the contained fluid begins swirling in a rotational manner due to the directional configuration of nozzle 47. This produces a self-cleansing action tending to prevent contaminants from adhering to the wall 26.

Together with the swirling action, the smoothly curving wall 26 encourages particulate contaminates to flow toward and out orifice 27 to outlet pipe 28. Pipe 28 slopes carrying the outlet fluid abruptly away from line of sight to the interior of container 10.

Orifice 50 is restricted in size relative to orifice 27 to insure that the great majority of outlet fluid passes out orifice 27 carrying heavy contaminant particles with it.

The outlet fluid then passes up riser 32, joins whatever liquid or gas vents through pipe 46 and passes to the outlet system through coupling flange 55.

When it becomes desirable to clean container 10 due to any accumulated crud, housing 11 must be separated from the upper assembly at cover plate 35. Fluid flow is turned off and the unit is drained at plug 31. The unit is then removed from the main by disconnecting at flanges 48 and 55. The flange coupling 52 is unbolted, then bolts 61 are removed.

If shielding material 60 has been cast in place, bolts 38 would not be used so that removal of bolts 61 at this point will release the upper assembly including cover plate 35 from housing 11.

However, if shielding material 60 is precast as depicted, it must be removed for access to bolts 38 which must likewise be removed.

The upper assembly is then removed from housing 11 giving access to container 10. Container 10 readily lifts out from o-ring 22 for cleaning.

After cleaning, container 10 is reinserted and the bolting down of cover plate 35 compresses o-ring 22 against the curved lip of orifice 27 and simultaneously compresses o-ring 37 against lip 25.

The bowl-shape of container 10 has been described with relation to its advantages for self-cleaning action. It has been found that an increase in absolute sensitivity per unit volume is obtained particularly when the bottom of container 10 is substantially hemispherical relative to a center of curvature at the detector element of detector 42. In use this element is located adjacent the bottom of well 41. This advantage is due to the fact that for a given sample volume, a sphere with the detector element at its center provides the minimum mean distance between the detector and all parts of the volume. Thus a complete sphere would be even more sensitive per unit volume than the described embodiment which has been preferred due to design considerations.

While the invention has been described with relation to a specific embodiment, various related configurations are contemplated.

Further, though the inventive apparatus has particular benefit for and has been described with relation to liquid fluids, it is also useful for monitoring gaseous fluids. This it is the intention to claim the invention broadly within the spirit and scope of the appended claims.

What is claimed is:

1. Apparatus for use with a radiation detector in measuring radioactivity in liquids in flow comprising:
   a. a bowl-shaped container having a cover;
   b. a well mounted in said cover for enclosing a radiation detector;
   c. radioactivity shielding metal surrounding said container;
   d. an inlet pipe passing through said shielding metal above said cover and down through said cover;
   e. a terminating orifice on said inlet pipe within said container directed so as to produce a swirling action in said container when liquid passes through said inlet pipe;
   f. an outlet pipe connected to an outlet at the bottom of said container and passing through said shielding metal below said container;
   g. a gas release pipe connected to said cover and passing through said shielding metal; and
   h. a riser pipe connected to said outlet pipe and rising to connect with said gas release pipe and provide a connection for an outlet main at a point above said cover.

2. Apparatus according to claim 1 wherein said shielding metal is separable in a plane adjacent to said cover and said cover and container are removable.

3. Apparatus according to claim 2 wherein said outlet at the bottom of said container follows a continuous curve from the interior of said container to a cylindrical orifice passing through and below a resilient sealing ring.

4. Apparatus according to claim 1 wherein said outlet pipe faces said outlet at an angle slanting away from the bottom of said container through said shielding metal whereby noise due to residual contaminants in said outlet pipe is substantially shielded from said container.

5. Apparatus according to claim 1 wherein said inlet pipe enters said shielding metal axially in line with said connection for an outlet main.

6. Apparatus according to claim 1 wherein the bottom of said container is substantially a hemisphere having a center of curvature at the bottom of said well.

7. A four pi shielded radioactivity monitoring apparatus for a fluid in flow comprising:
   a. A sampling container for holding a constant volume of said fluid in flow, designed for connection in a fixed attitude with a usual top and bottom;
   b. a radiation detector supported within said container for detecting radioactivity in the contained volume;
   c. nuclear radiation shielding substantially completely encompassing said container;
   d. an inlet pipe passing through said shielding in a horizontal plane above said container and then turning downward into said container within said shielding; and
   e. an outlet pipe connected to the bottom of said container and turning immediately away from the bottom of said container within said shielding passing to the outside of said shielding in a path below said container, all whereby direct unshielded paths for exterior radioactive noise to said container are substantially eliminated.

8. Radioactivity monitoring apparatus according to claim 7 wherein said fluid is a liquid and said inlet pipe terminates inside said container in a nozzle directed along the sidewall of said container so that an inlet stream of liquid will rpoduce swirling of the contained liquid.

9. Radioactivity monitoring apparatus according to claim 7 wherein said container is bowl-shaped with a highly finished sidewall curving smoothly and continuously into an outlet orifice at the connection of said outlet pipe.

10. Radioactivity monitoring apparatus according to claim 9 further comprising a housing about said container; a cover over said housing; a first o-ring gasket between said cover and a lip of said container sealing the top of said container; and, a second o-ring gasket supported in the bottom of said housing at said outlet orifice for sealing the connection between said container and said outlet pipe.

11. Radiation monitoring apparatus according to claim 10 wherein said cover is removably secured to said housing and said container is removable from said housing upon removal of said cover.

12. Apparatus for use with a radiation detector in measuring radioactivity in fluids in flow comprising:
   a. Four pi nuclear radiation shielding;
   b. a bowl-shaped sample volume container removably secured within said shielding;
   c. an inlet connection entering said shielding above said container and terminating in an orifice within said container directed to induce a swirling action;
   d. an outlet connection from the bottom of said container leaving said shielding below said container and then rising to an outlet main connection above said container; and
   e. means to support a radiation detector within said container.

13. Apparatus according to claim 12 in which said fluid is a liquid.

14. Apparatus according to claim 12 in which said fluid is a gas.

* * * * *

UNITED STATES PATENT OFFICE
CERTIFICATE OF CORRECTION

Patent No. 3,790,804    Dated February 5, 1974

Inventor(s) DAVID O. HUNT

It is certified that error appears in the above-identified patent and that said Letters Patent are hereby corrected as shown below:

The Assignee of this patent should read:

--LFE Corporation, Waltham, Mass.--

Signed and sealed this 3rd day of September 1974.

(SEAL)
Attest:

McCOY M. GIBSON, JR.
Attesting Officer

C. MARSHALL DANN
Commissioner of Patents

NOTE: Please return certified copy to: LFE Corporation
1601 Trapelo Road
Waltham, MA. 02154